FATIGUE CRACKING TEST APPARATUS

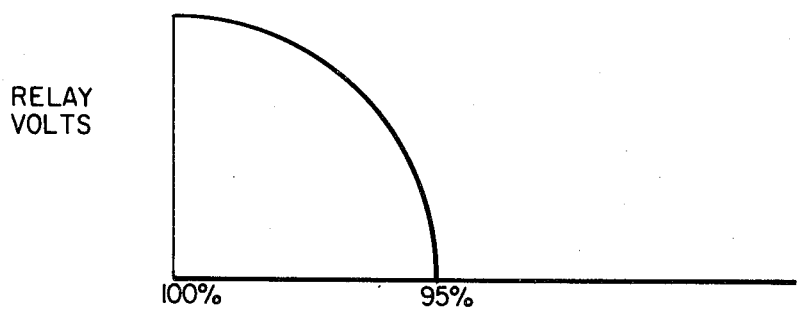
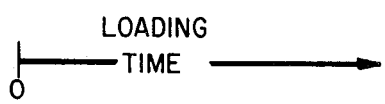
(a)
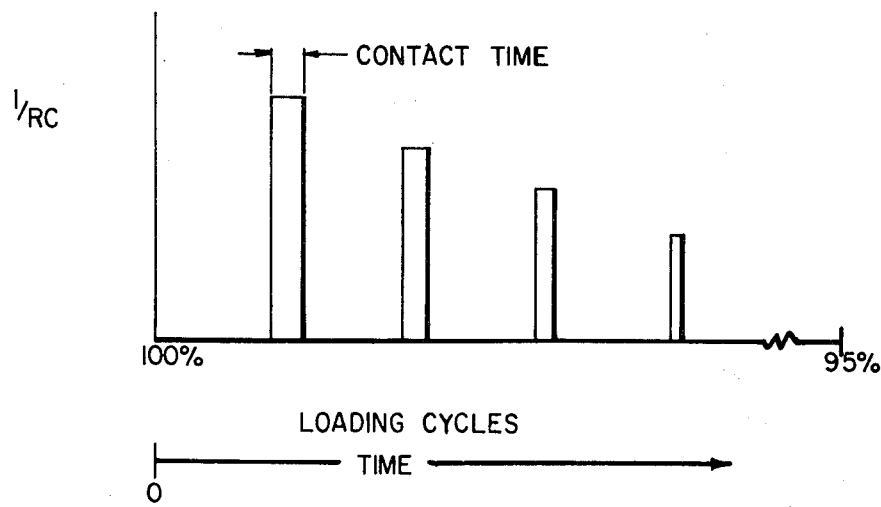
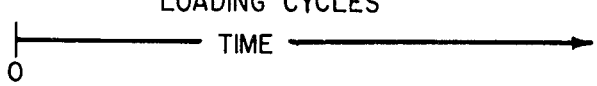
(b)
Fig-1
GEORGE ORNER
INVENTOR.
BY David A. Reid
ATTORNEY June 23, 1964  G. M. ORNER  3,138,016

Filed Oct. 3, 1962  5 Sheets-Sheet 2

GEORGE ORNER
INVENTOR.

BY David A. Rich

ATTORNEY

June 23, 1964 G. M. ORNER 3,138,016
FATIGUE CRACKING TEST APPARATUS
Filed Oct. 3, 1962 5 Sheets-Sheet 3
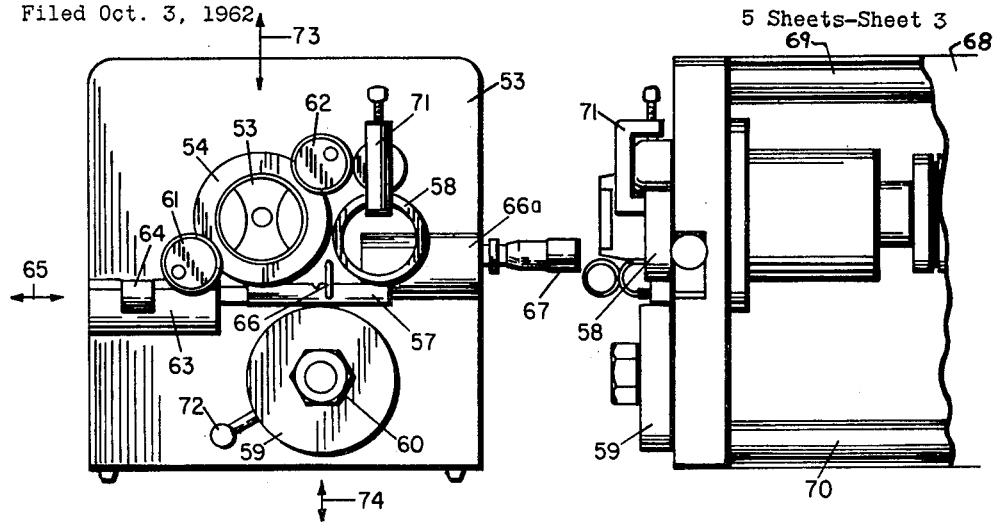
*Fig-4*  *Fig-5*
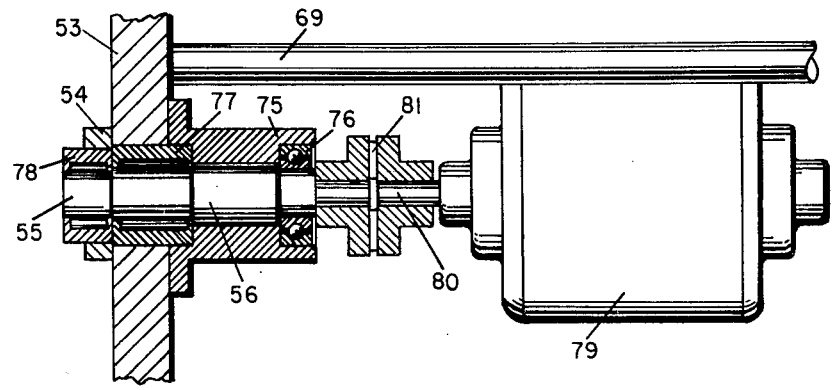
*Fig-6*
GEORGE ORNER
INVENTOR.
BY David A. Rich
ATTORNEY June 23, 1964  G. M. ORNER  3,138,016
FATIGUE CRACKING TEST APPARATUS
Filed Oct. 3, 1962  5 Sheets-Sheet 4
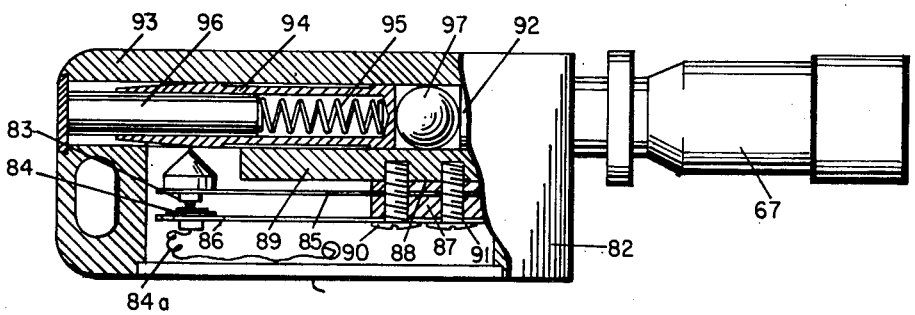
_Fig-7_
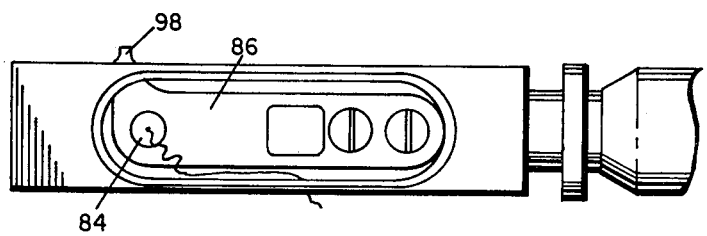
_Fig-8_
GEORGE ORNER
*INVENTOR.*
BY David A. Rich
ATTORNEY

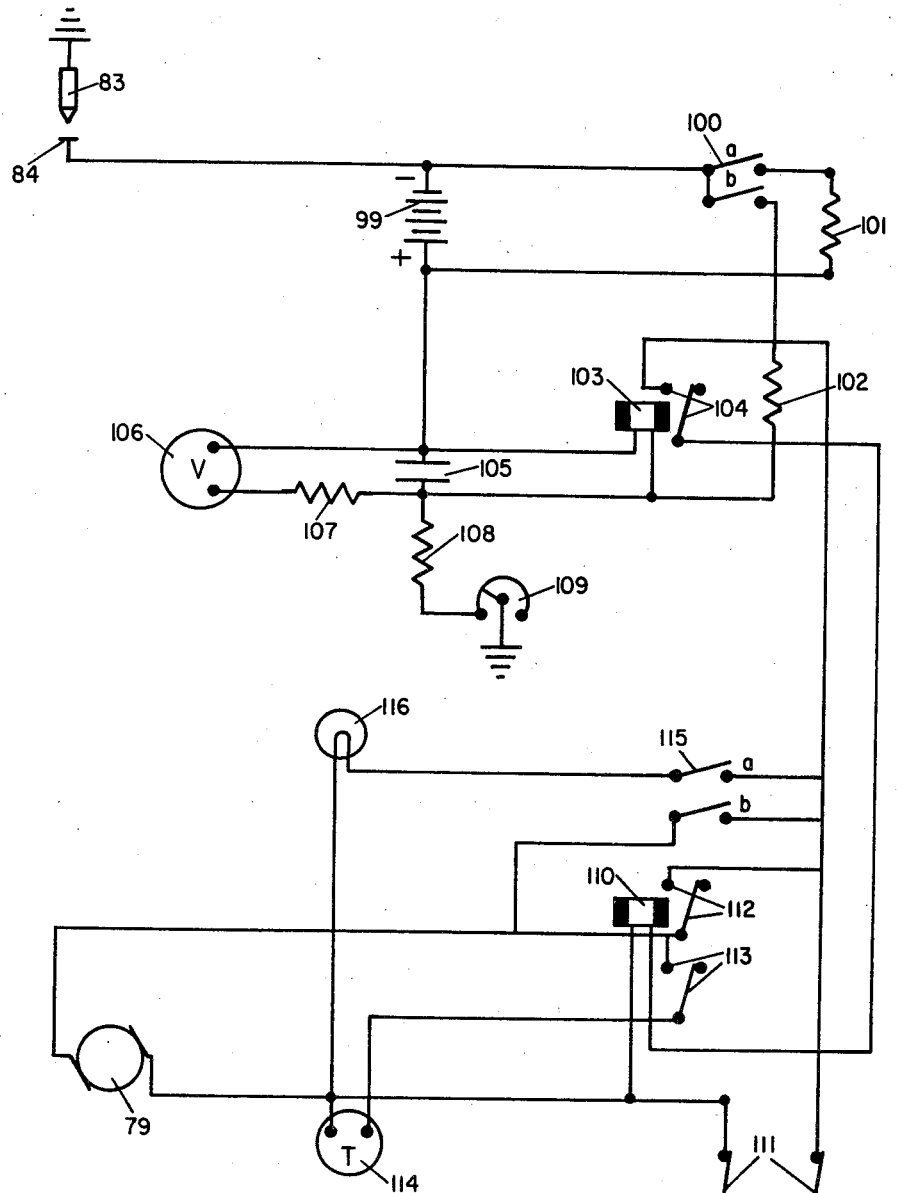

United States Patent Office 3,138,016
Patented June 23, 1964

3,138,016
FATIGUE CRACKING TEST APPARATUS
George M. Orner, Cochituate, Mass., assignor to Manlabs, Inc., Cambridge, Mass., a corporation of Massachusetts
Filed Oct. 3, 1962, Ser. No. 228,191
6 Claims. (Cl. 73—91)

The present invention relates to the art of mechanical testing. More particularly, the invention relates to apparatus associated with material fracture toughness testing. More especially, the invention relates to control apparatus for fatigue cracking fracture toughness test specimens.

The development of the Charpy impact test provided the basis for an apparatus useful for fracture toughness test purposes. In general, such a machine structurally includes a pendulous member carrying an impact head. The shape of the pendulous member is generally similar to the well-known pendulum arm and bob member. The pendulum is pivotally supported about an axis of rotation in a support member attached to mechanical ground. The bob swings through an anvil which supports the test specimen. The impact head or tup next to the bob is typically located between the axis of rotation and the free end of the bob. This position broadly corresponds with the center of percussion.

In order to obtain reproducible and reliable quantitative fracture toughness data with the Charpy impact test, it is necessary to pre-crack the specimen. Reproducibly pre-cracking test specimens provide the Charpy impact test a high degree of reliability. That is to say, the energy required to shatter a test specimen is reliably reproducible when the specimen is pre-cracked. This is particularly true for low energy samples.

By using fatigue cracking it is possible to pre-crack specimens to provide a predetermined crack depth. In the past, it has not been considered necessary to pre-crack Charpy test specimens to obtain useful results. More recently, however, it has been amply demonstrated experimentally that the results of Charpy impact tests are not a proper indication of the fracture toughness unless the sample is indeed pre-cracked. The typical Charpy test specimen has a notch or other opening formed in the test specimen to guide the opening crack. Here we are interested in pre-cracking the specimen in addition to providing a notch by fatiguing a test specimen.

In the prior art, a number of machines have been proposed for fatigue testing as well as fatigue cracking. In general, such apparatus is designed to break the specimen to provide an indication of fatigue strength.

A fatigue testing machine is described in a Patent No. 2,243,413 issued May 27, 1941 to Buckingham. In Buckingham, the specimen is held rigidly in place at an end. The specimen is elongated and cyclically loaded to vibrate in response to the reciprocating motion of a connecting rod. This machine is designed to apply a constant predetermined load to a wide variety of specimen shapes and sizes. Operationally, Buckingham utilizes the deflections of a loading ring to displace a differential transformer which supplies a signal proportional to the total loading for maintaining the loading constant to obtain a measure of fatigue strength. In contrast with the Buckingham apparatus, the apparatus of the present invention responds only to the final increment in the maximum value of a changing load and in fact operates to shut off the apparatus when the loading has been decreased to a predetermined level. Furthermore, the control apparatus of the present invention includes a pressure responsive transducer to provide a signal whereas the Buckingham device responds only to a straight displacement signal. As a result the Buckingham apparatus is not sufficiently sensitive for the problem solved by the instant invention. Furthermore, his apparatus is much more complicated than that of the present invention.

An apparatus for testing axles and the like is described in Patent No. 2,180,363 issued to O. J. Horger on November 21, 1939. This apparatus is directed to the problem of testing large axles. The axles or specimens are gripped at one end and rotated while a transverse load is applied at the free end. Because the specimens are long, a decrease in the stiffness of the specimens due to fatigue cracking causes a comparatively large change in deflection in the direction of the load. Consequently a simple limit switch is used to shut the motor off when cracking occurs. This concept is inappropriate as a solution to the present problem where short specimens are cracked from .005 to .05 inch deep.

A number of other patents directed to machines designed for fatigue testing tensile specimens and which incorporate a relatively simple limit switch to shut off the apparatus after the specimens break. Examples of these patents include Patents No. 2,467,677 issued to R. Hermite on April 19, 1949, No. 2,591,444 issued to B. J. Lazan on April 1, 1952 and No. 2,486,567 issued to B. J. Lazan on November 1, 1949.

It is therefore an object of the invention to provide an improved control apparatus for producing an output control signal in proportion to the amplitude and duration of the final increment of an intermittent load.

A further object of the invention is to provide an improved control apparatus for pre-cracking a test specimen for fracture toughness testing.

Still another object of the invention is to provide an improved control apparatus for reproducibly pre-cracking a test specimen a predetermined degree.

Still another object of the invention is to provide an improved control apparatus for pre-cracking test specimens for fracture toughness tests adaptable for use with extremely high strength materials.

In accordance with the invention there is provided a control apparatus. The apparatus includes load responsive means for providing a displacement proportional to the degree of loading during each cycle of an intermittent load. Pressure responsive transducer means are so coupled to the load means as to provide an electrical signal proportional to pressure produced over and above a predetermined value by each of the displacements. Duration control means are coupled to the load and pressure means and responsive to the displacement for controlling the period for each loading cycle during which the pressure means is enabled to provide each of the electrical signals. Output means are responsive to the electrical signals to produce an output control signal in proportion to the amplitude and duration of the electrical signals.

Other and further objects of the invention will be apparent from the following description of the invention, taken in connection with the accompanying drawings and its scope will be pointed out in the appended claims.

In the drawings:

FIG. 1 is a pair of graphs illustrating the operation of the invention, wherein FIG. 1(a) shows the relationship between relay volts and loading time and FIG. 1(b) shows the relationship between contact time, $1/RC$ and loading time;

FIG. 4 is a front elevational view of a fatigue cracking apparatus embodying the invention;

FIG. 5 is a side view, partially cut away, of the apparatus in FIG. 4;

FIG. 6 is an enlarged, fragmentary, detailed view, in section, of the drive mechanism in the apparatus in FIG. 5;

FIG. 7 is a side elevational view, partially cut away, of the micrometer adjustment mechanism for the apparatus in FIG. 4;

FIG. 8 is a plan view partially fragmentary of the mechanism in FIG. 7; and

FIG. 9 is an electrical circuit diagram of the apparatus in FIG. 4.

*Principles of Operation*

Figure 2:
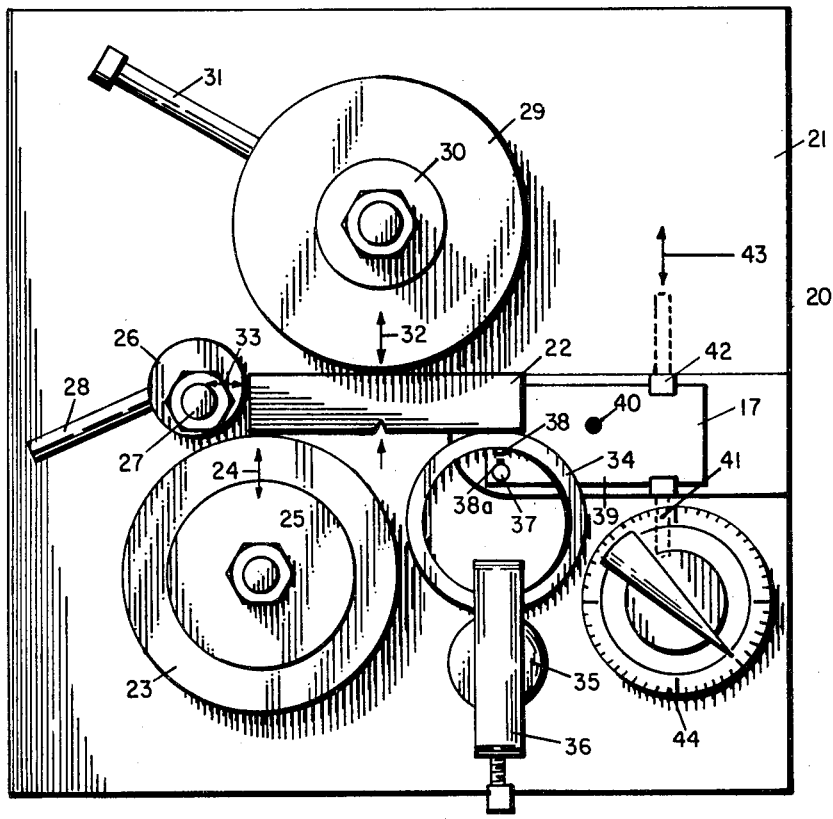
FIG. 2 is a simplified, schematic mechanical diagram of a control apparatus embodying the invention.

To conduct a Charpy fracture toughness test, the specimen is placed across the anvils of the machine with the fatigue cracked notch accurately centered. The anvil is so located with respect to the pendulum that the tup (attached, e.g., to the pendulum at its center of percussion) strikes the specimen directly behind the notch to fracture the specimen. The height to which the pendulum rises after fracturing the specimen is indicated. Since the weight of the pendulum and the exact height from which it was released are known, the energy absorbed in fracturing the specimen may be calculated from the expression:

$$E = (H_R - H_F)M$$

where energy absorbed = (release height − final height) × weight

E is the energy absorbed, $H_R$ the release height, $H_F$ the final height and M is the mass of the pendulum.

Since the pendulum is supported on nearly frictionless bearings and the impact occurs at its center of percussion (reducing vibrational losses to a minimum), the accuracy of the energy to fracture measurement is very high. It depends largely on the accuracy to which the final height $H_F$ of the pendulum may be read. The results of the test are calculated in terms of energy to fracture per unit area of crack surface, i.e., $E/A$, where A is the cross-sectional area of specimen under the fatigue crack.

This criterion is a highly important material property, known as fracture toughness. From this value the minimum flaw or crack size necessary to initiate premature failure in a loaded structure may be calculated.

A welded solid fuel rocket motor case, for example, can be inspected for flaws and cracks visually, or by X-ray and other non-destructive tests, down to a certain limiting size. Smaller flaws cannot be detected. If the fracture toughness of the case material is sufficient to withstand the maximum size of flaw that passes undetected, at its maximum working stress, premature failure of the case can be avoided.

As noted above, a typical Charpy specimen is rectangular in shape and has the typical dimensions of .394 inch width by .394 inch thickness. A notch is formed in the center of the specimen typically .079 inch deep with a .010 inch root radius forming a flare angle of 45°. In such a specimen it is desirable to precrack the specimen at the vertex of the notch for a length of approximately .030 inch. It is not essential that the length of the crack be carefully controlled. The typical value for this length is .030 inch.

In accordance with the principles of the invention the specimen is supported in cantilever fashion and cyclically loaded by means, for example, of an eccentric shaft or cam which may be rotated by an electric motor alternately to load and unload the specimen. Loading of the sample takes place at one end in opposition to a fulcrum member causing through leverage action a displacement or deflection of the other end. The displacement end of the specimen is displaced in opposition to a load responsive member. The motion of the load responsive member due to the displacement of the test specimen is applied first to close a pair of electrical contacts and then to vary the resistance of the contacts by virtue of a pressure-resistive effect.

The term pressure-resistive as used herein means the effect of changing resistance in response to pressure. It is used herein particularly with respect to an electrical contact having internal resistance which changes in response to pressure.

The contacts control the passage of electrical current, for example, into a charging capacitor which is charged through the contacts and discharges through a control device such as a relay. Initially under maximum pressure the contacts present a minimum of resistance and a maximum of current flows to charge the capacitor intermittently during the loading periods provided by the eccentric cam or shaft. So long as the load is a maximum, current is discharged into the relay holding the contacts closed to enable the drive mechanism to continue the loading cycle. Once a crack is initiated, the loading tends to decrease with a resultant increase in resistance of the contacts as well as decrease in duration of the periods during which contact is made. At a predetermined level corresponding, for example, to 95% of maximum loading, the current level drops to a point where the relay is disabled, in turn disabling the drive mechanism.

Referring now to FIG. 1, there is here illustrated a pair of graphs (a) and (b) showing the relationship between the voltage across the relay and the loading time. In FIG. 1(b) the relation between the contact time, $1/RC$ and loading time is illustrated.

The eccentric cam typically provides loading for 60% of the cycle. As the crack progresses and decreases the loading on the load-responsive member, both the displacement and the pressure are decreased until the point is reached where the contact is broken, disabling the relay. The point is very carefully adjusted preferably by means of an extremely sensitive micrometer mechanism.

Figure 3:
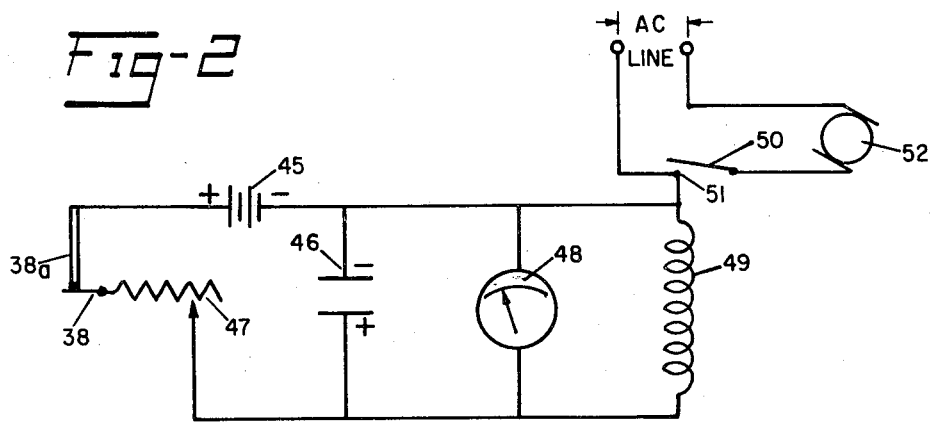
FIG. 3 is an electrical, schematic diagram of the apparatus in FIG. 2.

*Description and Explanation of the Control Apparatus in FIGS. 2 and 3*

Referring now to the drawings and with particular reference to FIG. 2, there is here illustrated a plan view of a simplified, mechanical, schematic diagram of a control apparatus embodying the invention. In this figure is generally illustrated a base which carries a vertical positioning fulcrum member coupled to the base to provide a fulcrum for the cantilevered test specimen. An eccentric horizontal positioning cam is coupled to the base for positioning the test specimen laterally relative to the fulcrum member along an axis orthogonal to the axis of translation of the fulcrum member. The eccentric loading shaft or cam is coupled to the base for applying loading to an end of the test specimen. It is driven preferably by an electric motor which is not shown in the drawing. Coupled to the base is a load responsive loading ring member supporting one end of the test specimen and responding to its deflection. Engaged by the loading ring member is a movable electric contact which makes contact with a pressure-resistive contact coupled to the base. The contacts control the circuit shown in FIG. 3 and will be described with reference to that figure. The contacts are adjusted by means of a micrometer adjustment to carefully reflect the degree of loading commensurate with a predetermined degree of pre-cracking or crack length.

In FIG. 2 the apparatus is generally indicated at 20. Coupled to a base 21 is a test specimen 22 which is supported in place by an eccentrically driven loading wheel or ring 23 which translates rotary motion to linear motion along an axis indicated by the arrow 24. The wheel 23 is coupled through a roller bearing to an eccentrically driven shaft 25 through the base 21 and driven by, for example, an electric motor not shown. The manner of eccentrically driving the wheel 23 is not discussed with respect to FIG. 2; however, the description below relating to the wheel 59 in FIG. 4 is analogous to the operation of the wheel 23. A horizontal positioning eccentric cam 26 is rotatable about a shaft 27 by means of operating lever 28. A rotary eccentric cam fulcrum member 29 is coupled through a shaft 30 to the base 21 and is rotatable by means of hand lever 31. The cam 29 is rotatable eccentrically to translate rotary action into linear motion along the axis indicated at 32 which is perpendicular to the axis of translation motion indicated at 33 for the cam 26. The translation motion of the cam 29 is parallel to that of the cam 23. As is apparent from the drawing, the cam 29 is held in place by a lock-nut after manual adjustment. A load responsive ring member 34 is coupled to the base 21 by means of a stud 35 connected to the base and a C clamp 36 which clamps to ring 34 against the stud 35. A movable electric contact 38 is engaged by the ring 34. An insulated post 37 is attached to a movable plate 39 and carries, for example, a pressure-resistive contact 38a, for example, of graphite.

The post 37 is coupled to the base by means of a movable plate 39 which is positioned to control the gap between the contacts 38 and 38a. The contact 38 is a resilient contact or spring contact which applies more or less pressure in proportion to the deflection of the load ring 34. The plate 39 pivots about a pivot 40 to enable adjustment of the spacing between the contacts. The plate 39 is held against an actuating plunger 41 by a spring loaded plunger 42. The actuator plunger pushes the plate along an axis indicated by the double headed arrow 43. A rotating micrometer dial 44 is coupled to the plunger 41 which is displaced as indicated by the double headed arrow 43 by rotation of the dial 44.

Referring now to FIG. 3, the contacts 38 and 38a are shown coupled to series with a source of direct current, here indicated as a battery 45. A capacitor 46 is connected in series with battery 45 and a variable resistor 47. In parallel with the capacitor 46 is a volt meter 48 and a relay coil 49. A pair of contacts 50 and 51 are actuated by the relay coil 49. The contacts are connected in series with a source of alternating current and control the operation of an electric motor 52 which drives the loading wheel as noted above.

*Operation*

The eccentrically driven shaft 25 is mounted on a pair of bearings and rotated, for example, at 2000 r.p.m. by, for example, a 1/12 horsepower motor connected to the shaft with a conventional belt. The journal at the upper end of the shaft may be machined eccentrically with the axis of the shaft and provides a total throw, for example, of the order of .020 inch. The journal may be connected to a hardened steel ring 23 by means of a needle roller bearing. The ring 23 does not rotate but merely oscillates back and forth with a total movement of, for example, .020 inch. This linear motion is transmitted directly to the test specimen 22. The other end of the specimen is supported on the load ring 34. The fulcrum disc is mounted eccentrically on the stud 30 about which it is rotated, for example, through approximately 180°. Here by rotating the disc clockwise, the specimen may be clamped against the oscillating wheel 23 and the load ring 34. A lateral positioning cam 26 may be rotated to position the specimen symmetrically with respect to the wheel 23 and the load ring 34 along the translation axis 33.

The cyclic loading provided by the wheel 23 against the left end, as shown, of the test specimen 22 produces a displacement at the other end of the specimen which is transmitted to the load ring 34. The displacement of the load ring 34 supplied through a spring loaded contact 38 first makes contact with the pressure-resistive contact 38a and then varies the pressure against the contact 38. With the specimen in place the rotation of the eccentric shaft 25 alternately loads the specimen and unloads it with the notch side in tension. The alternating load on the specimen loads and unloads the load ring 34 causing it to deflect and alternately close and open the contacts 38 and 38a.

The contacts are so adjusted by means of the micrometer 44 to close only when the load on the specimen is above a predetermined level, e.g., 95% or more of the maximum load. Conversely, when the load is reduced to below 95% of the maximum load the contacts open.

With reference to the circuit of FIG. 3, when the contacts 38 and 38a are closed, current from the battery 45 passes through the variable resistor 47 to charge the capacitor 46 with the polarities as shown. With the machine running the contacts alternately close and open, providing an intermittent current flowing from the battery through the resistor and capacitor. The capacitor continuously discharges through the relay coil 49. The rate of charge of the capacitor is adjusted to provide a voltage across the relay coil of approximately four times the release voltage of the relay. The rate of charge is, of course, a function of the fraction of the time the contacts are closed. The period during which the contacts are closed is in turn a function of the time the specimen is loaded within, for example, 5% of maximum load.

When a fatigue crack forms at the root of the notch in the specimen, decreasing its stiffness, the load decreases and consequently the voltage across the capacitor decreases. When the crack reaches a predetermined depth, for example, .030 inch deep, the load is reduced a predetermined amount, for example, close to 5%. The drop in voltage across the relay coil at that level disables the relay to disable the motor 52 and stop the loading cycle.

*Description and Explanation of the Apparatus in FIGS. 4–9*

Referring now to FIG. 4, there is here illustrated a front elevational of a preferred embodiment of the invention. A face plate 53 provides a vertical base to carry a gyrating or oscillating ring 54 which is mounted on an eccentric journal extension 55 of a shaft 56 shown particularly in the detailed view of FIG. 6. A test specimen 57 is shown in place supported by the ring 54, a load ring number 58 and an eccentrically mounted fulcrum disc 59. An eccentrically mounted disc or cam 59 may be raised or lowered and locked in place by means of a lock nut 60. Here guides 61 and 62 hold the oscillating loading member 54 in place. An adjustable stop 63 is movable by means, e.g., of a knurled nut control 64 to provide lateral positioning of the specimen 57 as indicated by the arrow 65. A spring loaded clip 66 is attached to the base 53 to retain the specimen. A contactor 66a is coupled to the load responsive ring 58 and adjusted by means of a micrometer mechanism 67.

In the side view of FIG. 5 a housing 68 is shown and support members 69 and 70 are revealed. The load responsive ring member 58 is clamped in place by means of a C clamp member 71 shown particularly in FIG. 5. The position of the disc 59 is adjusted by means of a lever 72 coupled to the disc. As shown in FIG. 6 the shaft 56 is supported at its journaled ends in a bearing housing 75 which carries a ball bearing 76 and a roller bearing 77 which is also supported by the base 53. A needle roller bearing 78 is carried by the eccentrically journaled section 55 of the shaft 56. The inner race of the bearing rotates with the eccentric journal section 55 and the outer race is merely translated up and down vertically in the drawing. An electric motor 79 is coupled through its shaft 80 and a flexible coupling section 81 to the shaft 56.

Referring now to FIGS. 7 and 8, there is here illustrated the mechanism for controlling the spacing between the electrical contacts. The housing 82 of the micrometer mechanism is shown cut away to reveal a pressure-resistive contact 83 and movable electrical contact 84 which effectively controls the contact time in response to the loading ring member 58. The contact 83 is carried by a spring member 85 and the contact 84 is carried by the movable spring member 86. The contact 84 is insulated from the spring member 86, for example, by means of an insulating bushing. A wire 84a is connected to provide an electrical connection to the contact 84.

The members 85 and 86 are mounted on a bar 89 by means of a pair of retainer screws 90 and 91. The piston member 92 forms a part of the micrometer dial mechanism and moves transversely in the view as shown. A cylinder is formed in the block 93 to carry a tapered plunger 94 which is held in place by a spring 95 coupled to a plunger 96 about which the tapered plunger 94 translates laterally. As will be apparent from FIG. 7, the motion of the plunger 94 adjusts the position of the contact 83 with respect to the contact 84. A ball 97 is positioned between the spindle 92 and the plunger 95. As shown particularly in FIG. 8, the spring support member 86 for the movable contact 84 has the extension 98 which moves perpendicular to the plane of the drawing in response to the deflections of the load responsive ring member 58.

Referring now to FIG. 9, there is here illustrated the electrical circuit diagram for the apparatus in FIGS. 4–8. The contact 83 is shown connected to ground. The movable contact 84 is connected to a D.C. supply 99 and a double pole single throw battery test switch 100. The pole *a* connects resistor 101 across battery 99. The pole *b* is connected to a resistor 102 which is connected in turn in series with a relay coil 103. The relay coil 103 is connected back to the battery 99. In parallel with the coil 103 is a capacitor 105, and a volt meter circuit including a meter 106 and resistor 107. The switch 100 puts artificial load (resistance 101) and volt meter circuit across the battery. A resistor 108 is connected in series with a variable resistor 109 to ground. The contacts 104 of the relay 103 are connected in series with a relay coil 110 and the A.C. power supply. A double pole, single throw switch 111 is connected in series with the power supply line to provide an on-off switch. The motor 79 is connected between one side of the A.C. line and the contacts 112, of the relay 110, to the other side of the A.C. line. The contacts 113 of the relay 110 provide a circuit through an elapsed time meter 114 to the other side of the A.C. line. A single throw double pole switch 115 has the pole *a* connected in series from one side of the A.C. line through an indicator light 116 to the other side of the line. The pole *b* is connected from one side of the A.C. line to short out the relay contact 112 when the switch 115 is in the manual (closed) position.

Switch 100 is a momentary contact, manually operated push button used for checking the condition of the battery. Resistance 101 provides a relatively low resistance load on the battery to displace the normal load on the battery so that if it is low its condition will be immediately apparent. Current flowing through resistance 102 (when switch 100 is closed) flows through relay coil 103 and returns to the battery. No current flows through resistances 108 and 109 unless the machine is running, closing points 83 and 84. Current flowing through resistance 107 and microammeter 106 is proportional to the current flowing through relay coil 103 and hence a measure of the battery voltage when the battery is under load.

The resistance 109 is adjusted to produce an intermittent current flow averaging one to two milliamps.

When the "auto-manual" switch 115 is closed, current is supplied directly to the motor through the line to drive the eccentric shaft to load and unload the test specimen. The deflection of the test specimen is translated to the load responsive ring member 58 which causes the contact 84 of the contactor to open and close intermittently or cyclically. The closing of the contact provides current flow from the battery 99 through the relay coil 103, resistor 108 and resistor 109. The charge current for the capacitor 105 through the resistors 108 and 109 is also provided.

The capacitor is charged intermittently directly from the battery 99 and discharged continuously through the relay coils 103 and volt meter circuit comprising the microampmeter 106 and high impedance resistor 107. The meter provides a measure of the charge in the capacitor which is a function of the amplitude of the incoming electrical signals. The signals are dependent upon the stiffness of the specimen and hence on the depth of the crack which in turn varies the degree of loading.

When the auto-manual switch 115 is closed, the motor 79 is started and the voltage across the capacitor builds up to a predetermined level to close the sensitive relay 103. The relay 103 controls the operation of the drive relay 110. The closing of the relay 110 provides an alternate route for current flow to the motor 79. The auto-manual switch 115 is then opened manually.

As the fatigue crack forms, the signals decrease in amplitude to produce a decreasing voltage across the capacitor 105. When the voltage decreases to a predetermined level, the relay 103 is disabled and in turn disables the relay 115 by the opening of the contacts 104 to stop the motor and remove the loading. The elapsed time meter 114 is controlled by the contacts 113 and provides a direct measure of the running time of the motor with the specimen under load, i.e., meter does not start until signals from contacts 83 and 84 close relay 110. From the speed of the motor and the running time, the number of stress cycles may be calculated. The pilot light 116 is on whenever the auto-manual switch 115 is on "Manual," i.e., when it is closed. This provides a warning light indicating that the machine is not on automatic control.

It will be apparent from the foregoing discussion that the invention has immediate and broad application to the problem of fracture toughness testing. Beyond this the control apparatus provides a mechanism for producing a control signal in response to intermittent loading cycles. As a control apparatus this implies broad application for control purposes.

While there has hereinbefore been presented what are considered to be the preferred embodiments of the invention, it will be apparent to those of ordinary skill in the art that many and various changes and modifications may be made with respect to the embodiments described and illustrated without departing from the spirit of the invention. It will be understood, therefore, that all such changes and modifications as fall fairly within the scope of the present invention, as defined in the appended claims, are to be considered as a part of the present invention.

What is claimed is:

1. Fatigue cracking test apparatus for pre-cracking test specimens for fracture toughness, said apparatus comprising:
   a base;
   input cyclical loading means coupled to said base for cyclically varying the loading on a test specimen, said input cyclical loading means including eccentric loading means for loading said test specimen;
   load responsive means coupled to said base for providing a displacement in response to the motion of said test specimen and proportional to the degree of loading during each said variable loading cycle;
   pressure responsive transducer means coupled to said load responsive means and said base to provide electrical signal pulses proportional to pressure produced by each said displacement only during a portion of each said loading cycle;
   duration control means coupling said load responsive and pressure responsive transducer means and responsive to said displacement for controlling the period for each loading cycle during which said pressure responsive transducer means is enabled to provide each said electrical signal pulse; and
   output means coupled to said input cyclical loading means and responsive to said electrical signal pulses to produce an output control signal in proportion to the amplitude and duration of said electrical signal pulses for disabling said input cyclical loading means.

2. Fatigue cracking test apparatus for pre-cracking test specimens for fracture toughness, said apparatus comprising:

a base;

input cyclical loading means coupled to said base for cyclically varying the loading on a test specimen, said input cyclical loading means including eccentric loading means for loading said test specimen;

load responsive means coupled to said base for providing a displacement in response to the motion of said test specimen and proportional to the degree of loading during each said variable loading cycle;

pressure responsive transducer means coupled to said load responsive means and said base to provide electrical signal pulses proportional to pressure produced by each said displacement only during a portion of each said loading cycle;

duration control means coupling said load responsive and pressure responsive transducer means and responsive to said displacement for controlling the period for each loading cycle during which pressure responsive transducer means is enabled to provide each said electrical signal pulse, said duration control means disabling said pressure responsive transducer means in response to a predetermined decrease in said loading; and output means coupled to said input cyclical loading means and responsive to said electrical signal pulses to produce an output control signal in proportion to the amplitude and duration of said electrical signal pulses for disabling said input cyclical loading means.

3. Fatigue cracking test apparatus for pre-cracking test specimens for fracture toughness, said apparatus comprising:

a base;

input cyclical loading means coupled to said base for cyclically varying the loading on a test specimen, said input cyclical loading means including eccentric loading means for loading said test specimen;

load responsive means coupled to said base for providing a displacement in response to the motion of said test specimen and proportional to the degree of loading during each said variable loading cycle;

pressure responsive transducer means, including a pressure-resistive contact member, coupled to said load responsive means and said base to provide electrical signal pulses proportional to pressure produced by each said displacement only during a portion of each said loading cycle;

duration control means coupling said load responsive and pressure responsive transducer means and responsive to said displacement for controlling the period for each loading cycle during which said pressure responsive transducer means is enabled to provide each said electrical signal pulse; and output means coupled to said input cyclical loading means and responsive to said electrical signal pulses to produce an output control signal in proportion to the amplitude and duration of said electrical signal pulses for disabling said input cyclical loading means.

4. Fatigue cracking test apparatus for pre-cracking test specimens for fracture toughness, said apparatus comprising:

a base;

input cyclical loading means coupled to said base for cyclically varying the loading on a test specimen, said input cyclical loading means including eccentric loading means for loading said test specimen, drive means coupled to said eccentric means for driving said eccentric means, eccentric positioning means for positioning said specimen along an axis, and adjustable fulcrum means for positioning said specimen along an axis orthogonal to the first axis and for adjusting the degree of loading for said test specimen;

load responsive means coupled to said base for providing a displacement in response to the motion of said test specimen and proportional to the degree of loading during each said variable loading cycle;

pressure responsive transducer means coupled to said load responsive means and said base to provide electrical signal pulses proportional to pressure produced by each said displacement only during a portion of each said loading cycle;

duration control means coupling said load responsive and pressure responsive transducer means and responsive to said displacement for controlling the period for each loading cycle during which said pressure responsive transducer means is enabled to provide each said electrical signal pulse; and output means coupled to said input cyclical loading means and responsive to said electrical signal pulses to produce an output control signal in proportion to the amplitude and duration of said electrical signal pulses for disabling said input cyclical loading means.

5. A fatigue cracking test apparatus for pre-cracking test specimens for fracture toughness, said apparatus comprising:

a base;

eccentric cam means for loading an end of said test specimen;

drive means coupled to said cam means for driving said eccentric cam means;

eccentric cam positioning means coupled to said base means for positioning said specimen along an axis;

eccentric cam fulcrum means coupled to said base for positioning said specimen along an axis orthogonal to the first said axis and for adjusting the degree of loading for said test specimen along an axis parallel to the axis of translation of said eccentric cam loading means;

annular load responsive means coupled to said base and for coupling the other end of said specimen for displacement in response to the displacement of said test specimen when loaded by said eccentric cam loading means in opposition to said fulcrum means whereby a leverage action is produced;

electrical contact means carried by said annular load responsive means for producing an electrical signal, in response to said displacement of said annular load responsive means, for and controlling the duration of said signal during the intermittent loading of said test specimen;

pressure-resistive contact means coupled to said base for contacting the first said contact means in response to the displacement of said annular means and characterized by a variable resistance in accordance with variations in pressure; and control circuit apparatus coupled to said contacts and said drive means for disabling said drive means in response to electrical signals proportional to the amplitude and duration of loading during each cycle for said test specimen.

6. The apparatus in claim 5 wherein said control circuit apparatus includes a variable resistance in series with said contacts, a source of direct current, a capacitor in series with said source and said resistance, indicator means coupled in parallel with said capacitor and relay means coupled in parallel with said capacitor, the contacts of said relay controlling the operation of said drive means.

References Cited in the file of this patent

UNITED STATES PATENTS

| | | |
|---|---|---|
| 2,439,092 | Linstrom | Apr. 6, 1948 |
| 2,752,558 | Kane | June 25, 1956 |
| 2,904,735 | Cullen et al. | Sept. 15, 1959 |